US010929557B2

(12) United States Patent
Chavez

(10) Patent No.: US 10,929,557 B2
(45) Date of Patent: Feb. 23, 2021

(54) EXPORTED DIGITAL RELATIONSHIPS

(71) Applicant: Avaya Inc., Santa Clara, CA (US)

(72) Inventor: David Chavez, Broomfield, CO (US)

(73) Assignee: Avaya Inc., Santa Clara, CA (US)

(*) Notice: Subject to any disclaimer, the term of this patent is extended or adjusted under 35 U.S.C. 154(b) by 180 days.

(21) Appl. No.: 16/029,225

(22) Filed: Jul. 6, 2018

(65) Prior Publication Data

US 2020/0012810 A1 Jan. 9, 2020

(51) Int. Cl.
*G06F 21/62* (2013.01)
*G06F 21/60* (2013.01)
*G06F 16/28* (2019.01)
*G06F 16/955* (2019.01)
*G06F 16/9535* (2019.01)

(52) U.S. Cl.
CPC ........ *G06F 21/6245* (2013.01); *G06F 16/288* (2019.01); *G06F 16/955* (2019.01); *G06F 16/9535* (2019.01); *G06F 21/604* (2013.01)

(58) Field of Classification Search
CPC .................................................. G06F 16/1748
See application file for complete search history.

(56) References Cited

U.S. PATENT DOCUMENTS

| 9,961,205 | B1 | 5/2018 | Chavez et al. |
| 2017/0295157 | A1 | 10/2017 | Chavez et al. |

| 2018/0097780 | A1* | 4/2018 | Olivier | H04L 67/10 |
| 2019/0251076 | A1* | 8/2019 | Yan | G06F 16/2365 |
| 2019/0303600 | A1* | 10/2019 | Hamel | H04L 63/102 |

FOREIGN PATENT DOCUMENTS

WO WO 2016/128567 8/2016

OTHER PUBLICATIONS

U.S. Appl. No. 15/602,408, filed May 23, 2017, Chavez et al.
"Blockchain security for your business." ShoCard Inc., 2017, 4 pages [retrieved online from: shocard.com/shobadge-demo].
"CIVIC ICO Token Raised $33 Million Sale Concludes," Steemit, 2017, 4 pages [retrieved online from: steemit.com/steem/@kaiyo/civic-ico-token-usd33-million-sale-concludes].
"Civic is collaborating with Intel: Digital identities secured with the blockchain," Civic, Feb. 2017, 2 pages [retrieved online from: s3.amazonaws.com/civic-marketing-assets/civic-intel-collaboration.pdf].

(Continued)

*Primary Examiner* — Simon P Kanaan
(74) *Attorney, Agent, or Firm* — Sheridan Ross P.C.

(57) ABSTRACT

The present disclosure provides a communication system and method, among other things. As a non-limiting example, the method includes enabling access to entries of personal digital data for a plurality of users; enabling at least some of the personal digital data for the plurality of users to be retrieved by a query that contains an identification of a first user and authentication information associated with the first user; receiving a group identifier that is stored with reference to personal digital data of the first user; and distributing relationship digital data that describes a relationship between the first user and the second user based on the existence of the group identifier.

20 Claims, 8 Drawing Sheets

(56) References Cited

OTHER PUBLICATIONS

"New kid on the blockchain CIVIC (CVC)," Steemit, 2017, 3 pages [retrieved online from: steemit.com/ethereum/@ajaramillo/new-kid-on-the-blockchain-civic-cvc].

"Truecaller and iOS 10 Bring Spam Identification to the Masses," Truecaller Blog, Sep. 7, 2016, 6 pages [retrieved online from: blog.truecaller.com/2016/09/07/truecaller-and-ios-10-bring-spam-identification-to-the-masses/].

"Truecaller: Caller ID & Dialer—Android Apps on Google Play," Google, 2017, 3 pages [retrieved online from: play.google.com/store/apps/details?id=com.truecaller&hl=en].

"Truecaller: Spam protection," Apple Inc., 2017, 3 pages [retrieved online from: itunes.apple.com/us/app/truecaller-spam-protection/id448142450?mt=8#].

Metz "Google's 'Android for Work' Gives Your Phone a Split Personality," Wired, Feb. 25, 2015, 9 pages [retrieved online from: www.wired.com/2015/02/googles-android-work-gives-phone-split-personality/].

\* cited by examiner

EXPORTED DIGITAL RELATIONSHIPS

FIELD OF THE DISCLOSURE

Embodiments of the present disclosure relate generally to user authentication systems and methods.

BACKGROUND

Imagine that a family is attending a game event (e.g., NFL game, MLB game, soccer match, etc.). The way that the world works today, in order to get into the event, the person who bought the tickets has to have an application on a smartphone to display digital tickets at the venue. Physical methods still exist (e.g., printed on paper), but are less preferred for many reasons. Application/digital ticketing is convenient, especially since an operator of a venue will want to know who attended. In a family scenario where one a patron buys multiple tickets (e.g., four tickets), the operator will only have information about the purchasing patron and not the other members of the group or family. It is likely, however, that any of the other three attendees may also have a smartphone. If any of the three are young, then it is less likely that they have their own smartphone. In the not so distant future, many children may have wearables, especially for services like location monitoring, medical, etc. As parents prefer to know exactly where their children are in a world of incidents, wearables become critical. Parents want the ability to immediately determine where children are and if they are ok.

In today's digital world from a digital perspective, a child does not exist or have a signature that is publicly available. Returning to the example above, the venue owner/operator also wants to understand if the group of people attending the event are a family. Such an understanding will enable the venue owner/operator to offer a better and more family-oriented experience. Thus, there are multiple parties of interest all wanting additional information about the family group, but there are conflicting interests of maintaining at least some information about a family group (e.g., information regarding minors) either obscured or non-existent.

BRIEF SUMMARY

Embodiments of the disclosure solves these and other issues by creating a digital family or group representation that an adult can represent to the external world. The digital family or group representation is one that is controlled by an adult. Moreover, the general control of communication, location information, etc. for the group as a whole would be in the hands of an administering adult. Asserted control for a child digitally would be in the hands of the parent or guardian.

One aspect of the present disclosure is to provide a concept of a family/group relationship, and then provide permissioning and control along with the family/group relationship. A digital family representation that an adult can represent to the external world provides information and asserted control for all family members, including children digitally at all times and in any venue.

In the case of a parent taking three kids to a game event (e.g., NFL, MLB, soccer, etc.), the kid might say, "I want to go get a drink." The parent can allow the child to go to concessions stand since the child is digitally connected. A stadium operator is also provided information on and understands the relationship of the child to the parent. Ultimately, however, the stadium operator is not provided with any specific information about the child, but rather is provided with information about the parent and/or the digital relationship between the parent and child. This could allow for a concession or merchandise purchase to be relayed to the parent for approval without the parent having to be physically present. It would also allow a venue to notify the parent if their child has wandered outside of a designated section, combined with historical analytics, it could notify of any relative change of behavior. In the case of an incident, the venue could direct all members of a family to a preferred and common rendezvous point.

The same parent may find it acceptable to have a family social media interaction if the interaction can be controlled by the parent. The digital relationship would likely be used for and with extended family and close friends. The family can be represented externally with some digital flare and whatever they would like to extend (grandparents—notes, well wishes, etc.). The solution would allow parental-level permissioning, especially content, location, etc. with varying levels of control/exposure to family and friends.

The solution can provide another manifestation of a physical relationship extended to a digital relationship (e.g., stickers on car with the child making the personalization decision) in other embodiments including extension on social media and other platforms. However, the concept is that a digital family is exported and ultimately extended to the outside world for consumption.

In some embodiments, the exported digital family representation could be implemented as a secured relational database with personal identity stored in the biometric identity management service. As a more specific example, the exported digital family representation could be implemented as a blockchain. Additional details of a suitable blockchain architecture that could be leveraged are described in U.S. patent application Ser. No. 15/284,103, filed Oct. 3, 2016, the entire contents of which are hereby incorporated herein by reference in their entirety. Personal identity could be paired with a digital device (e.g., smartphone, wearable, etc.). The new relational database could also be realized as a separate blockchain, but use of such a technology is not strictly required.

The representation externally would be a digital family identification (ID). What is represented to the entity receiving the digital family ID is based on the preconfigured settings the parent entered previously. The digital family ID could include a number of children, their ages, gender, communications permissioning, notifications permissioning, digital flare (iconography, avatars, language, etc.), and other information. A simple User Interface (UI) may be available for a parent to modify/change permissions for receivers (based on geofencing in the case of a venue or attempting communication and/or notification in other cases).

One aspect of the present disclosure provides a system that includes:
 a database comprising entries of data for a plurality of different users, wherein the entries of data include an association between a user and personally identifiable information associated with the user as well as an expression of a relationship between a first user and a second user; and
 a server, comprising:
  a microprocessor;
  a database interface that enables the microprocessor to access the entries of data maintained in the plurality of databases; and
  memory that comprises instructions that are executable by the microprocessor, the instructions comprising:

instructions that enable the server to access the database with a query that contains an identification of the first user; and instructions that enable a response from the database to include an indication that the first user has a relationship with the second user without exposing the personally identifiable information for either the first user or the second user.

Figure 1:
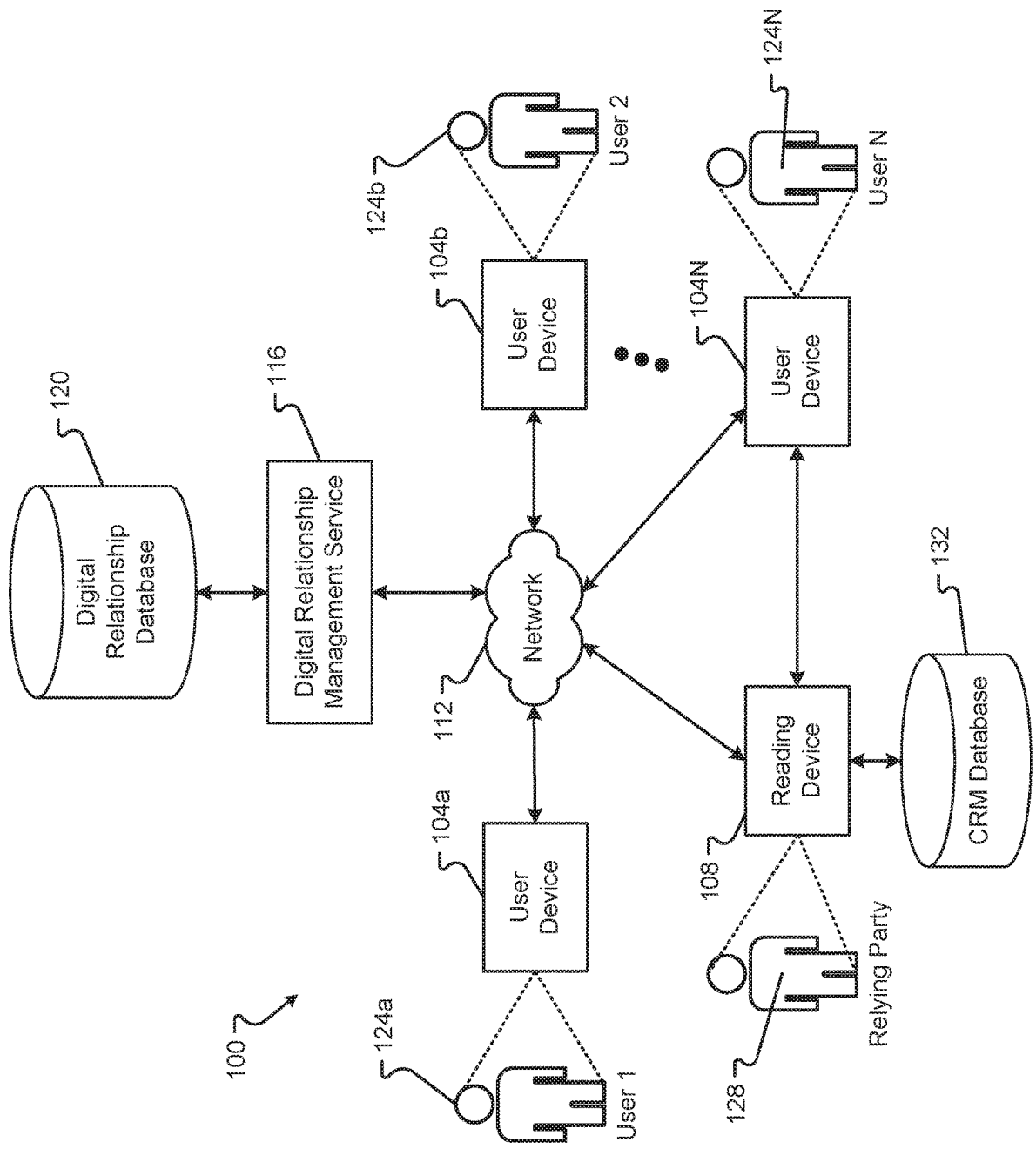
FIG. 1 is a block diagram illustrating components of a system according to one embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments of the disclosure provide systems and methods for persona-based presentation services, either from a mobile network core or directly from an application operating on a user device being carried by a caller or callee associated with a call. While the flowcharts will be discussed and illustrated in relation to a particular sequence of events, it should be appreciated that changes, additions, and omissions to this sequence can occur without materially affecting the operation of the disclosed embodiments, configuration, and aspects.

With reference now to FIG. 1, an illustrative communication system 100 will be described in accordance with at least some embodiments of the present disclosure. As shown in FIG. 1, the system 100 may include a plurality of user devices 104a-N along with one or more reading devices 108. The various devices 104a-N and 108 may communicate with one another via a communication network 112 or may communicate directly with one another using various types of known communication protocols (e.g., NFC, Bluetooth, etc.). In some embodiments, the direct device-to-device communications may occur between a user device and a reading device 108 while the reading device 108 is receiving information from the user device 104. As such, the deviceto-device connection may be temporary, and the length of the communication may depend upon the communication protocol being used. Alternatively or additionally, instead of using RF-based communication protocols, the devices may directly communicate with one another using one or more visual communication modalities. For instance, a user device 104 may display information (e.g., raw information or information represented by a QR code or the like) and the reading device 108 may read the information from the display of the user device 104. The reading device 108 may read the information from the user device 104 automatically or with the assistance/input of a user thereof.

In one non-limiting embodiment, one or both devices 104, 108 may be similar in their capabilities. The difference between a user device 104 and reading device 108 may simply be the type of user that utilizes the device. For instance, a user 124a-N belonging to an established group of users (e.g., a family, work associates, friends, etc.) may each have their respective user device 104a-N whereas a relying party 128 may utilize a reading device 108. In some embodiments, however, the reading device 108 may actually be a different type of device from the user devices 104a-N. As a non-limiting example, the user devices 104A-N may correspond to mobile communication devices (e.g., smartphones, tablets, wearable devices, etc.) that are carried by users 124a-N respectively whereas the reading device 108 may correspond to a Point of Sale (PoS) terminal or a reading appliance connected to a PoS terminal. As can be appreciated, however, the reading device 108 may also be provided as a mobile communication device that is similar or identical to the user devices 104a-N.

The communication network 112 may include a cellular or other wireless network and the user devices 104 and/or 108 can include smartphones, tablets, laptop computers, wearable devices, or any other portable electronic device configured to communicate over the network 112. It should be understood that while only three devices 104 and one reading device 108 are illustrated here for the sake of simplicity, any number of devices of different types may be connected with the network 112 at any given time or may be in direct communication with one another at any given time. Moreover, the constitution of the types of devices connecting to the network 112 and to each other may also vary over time.

The network 112 can also include an Internet Protocol (IP) Multimedia Subsystem (IMS) framework providing Internet and/or other data services to the devices 104, 108 over the network 112. Generally speaking, the IMS framework of the network 112 can utilize Session Initiation Protocol (SIP) and/or other Internet Engineering Task Force (IETF) standard protocols to provide any number of IP multimedia services including but not limited to Voice over IP (VoIP) calling, media streaming, web access, etc. Alternatively or additionally, the network 112 may include a distributed computing network such as the Internet or some other packet-based communication network.

The communication system 100 may further include one or more digital relationship databases 120 that are managed and utilized by a digital relationship management service 116. The digital relationship management service 116, in some embodiments, may be configured to manage the various digital relationships and interrelationships between users 124a-N. In some embodiments, the specific details of digital relationships between users 124a-N may be stored within the digital relationship database 120 and, in some instances, may be made available to the reading device 108 via the digital relationship management service 116. In some embodiments, the digital relationship management service 116 may be executed on one or more servers. The servers may have one set of Application Programming Interfaces (APIs) that expose the functionality of the digital relationship management service 116 to users 124a-N and another set of APIs that expose the functionality of the digital relationship management service 116 to the reading device 108. As will be discussed in further detail herein, users 124a-N may be enabled to establish digital relationships with one another and then define sharing permissions for those digital relationships that can be shared with the reading device 108 upon request.

The reading device 108 may rely upon information obtained from the digital relationship management service 116 in connection with performing various functions (e.g., performing financial transactions, providing goods, providing access to protected venues or seats within a venue, etc.). In some embodiments, the reading device 108 may request and use information obtained from the digital relationship management service 116 and temporarily store such information in a Customer Relationship Management (CRM) database 132 to facilitate interactions and transactions with one or all users 124a-N belonging to a shared group profile. This information maintained in the CRM database 132 can be transient (e.g., stored for only a predefined period of time) or persistent (e.g., stored permanently or at least until one of the users 124a-N request deletion of such information). However, the data stored in the CRM database 132 is generally not made directly available to users 124a-N as a matter of course. Further still, some information in the CRM database 132 may be anonymized or obfuscated so as to avoid storing Personally Identifiable Information (PII) associated with users 124a-N. On the other hand, information maintained in the digital relationship database 120 may be owned, administered, modified, and deleted by a user 124a-N directly. This information may only be made available to a reading device 108 upon request and, possibly, upon the reading device 108 providing a required proof or key that indicates the reading device 108 is currently communicating with a user device 104, thereby validating the reading device's 108 need (and user's 124 permission) to obtain information from the digital relationship database 120.

Figure 2:
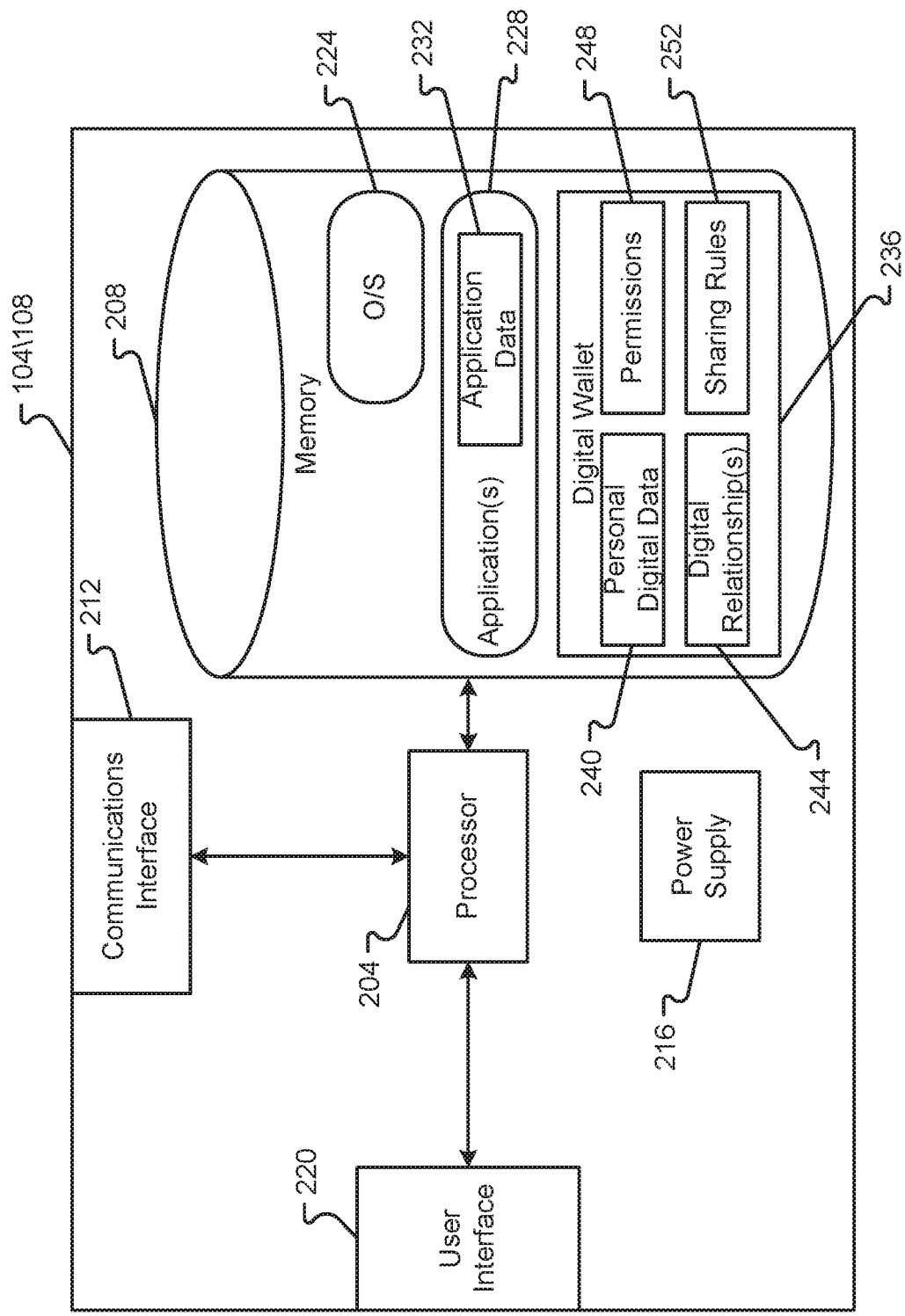
FIG. 2 is a block diagram illustrating components of a device according to one embodiment.

With reference now to FIG. 2, additional details of a device 104, 108 will be described in accordance with at least some embodiments of the present disclosure. Although the devices 104, 108 are referred to generally as user devices or reading devices, it should be appreciated that the device(s) 104, 108 may correspond to mobile communication devices, wearable communication devices, computers, laptops, tablets, Personal Digital Assistants (PDAs), PoS terminals, etc.

The illustrative device 104, 108 is shown to include a processor 204, memory 208, a communication interface 212, a power supply 216, and a user interface 220. In some embodiments, all of the components of device 104, 108 are provided within a common device housing and are connected via a one or multiple circuit boards.

The processor 204 may correspond to one or multiple processing circuits. In some embodiments, the processor 204 may include a microprocessor, an Integrated Circuit (IC) chip, an ASIC, or the like. The processor 204 may be configured with a plurality of logic circuits or circuit elements that enable the processor 204 to execute one or more instructions or instruction sets maintained in memory 208. Alternatively or additionally, the processor 204 may be configured to execute instructions received via the communications interface 212. As an example, the processor 204 may be configured to execute one or more drivers that are specifically provided for the communications interface 212 and/or the user interface 220.

The memory 208 is shown to be in communication with the processor 204. The memory 208 may include any type or combination of computer memory devices. Non-limiting examples of memory 208 include flash memory, volatile memory, non-volatile memory, RAM, NVRAM, SRAM, ROM, EEPROM, etc. As can be appreciated, the types of devices used for memory 208 may depend upon the nature and type of data stored in memory 208.

In the depicted embodiment, the memory 208 includes an operating system (O/S) 224, one or a plurality of applications 228, and a digital wallet 236. A user of the device 104, 108 may be enabled to access and utilize the applications 228 via use of the O/S 224. Examples of an O/S 224 include Apple iOS, Android OS, Blackberry OS, Windows OS, Palm OS, Open WebOS, etc. In some embodiments, the O/S 224 can be configured to provide a display of icons that are presented via the user interface 220. Some or all of the icons may be selectable by the user of the user device 104, 108 to access routines or features provided by applications 228. In some embodiments, each application 228 has a specific icon associated therewith that is presented via a home screen of the O/S 224. When that specific icon is selected by a user, the user interface 220 of the device 104, 108 may present application-specific data and application-specific graphics 232.

One or more of the applications 228 may also enable access to and management of information stored in the digital wallet 236. In some embodiments, the digital wallet 236 may correspond to a combination of a particular application 228 along with a secure data storage device. Said another way, the digital wallet 236 may correspond to a secured area of memory 208 (e.g., an area where data is stored with encryption) or the digital wallet 236 may correspond to a separate memory device (e.g., a Secure Element (SE)) that is different from the general memory 208 that stores other applications 228.

The digital wallet 236 is shown to store personal digital data 240, digital relationship data 244, permissions 238, and sharing rules 252. In some embodiments, the personal digital data 240 may correspond to personal data created by or created for a user of the user device 104. This personal digital data may also include one or more digital profiles created by/for the user 124 (e.g., online profiles, social network profiles, personal profiles, business profiles, etc.). This personal digital data 240 may include PII for the user 124 and may include contact information associated with the user 124. Alternatively or additionally, the personal digital data 240 may include pseudonyms for the user (e.g., username, user ID, etc.) within a particular application or web service. Alternatively or additionally, the personal digital data 240 may include account/transactional information associated with the user 124 (e.g., bank account information, credit card information, etc.). This personal digital data 240 may be stored securely and solely within the digital wallet 236 or may reference secure information stored on an external server (e.g., correspond to keys, passwords, user names, authentication credentials needed to access other personal digital data).

The digital relationship information 244, as compared to the personal digital data 240, may correspond to data that references another user and that other user's personal digital data 240. For instance, digital relationship information 244 for a first user 124*a* may include a pointer or reference to personal digital data 240 of a second user 124*b*. In this way, digital relationships 244 may be created between two or more users and may define the nature of the relationship between the users 124*a*, 124*b* along with other information that can be useful to a relying party 128 to complete a transaction, for example. The digital relationship information 244 for a particular user may include information that helps to locate and retrieve personal digital data 240 for another user. In some embodiments, however, the digital relationship information 244 may simply provide proof that one user 124 knows or is connected with another user 124 in a digital manner without providing further information about either user.

The permissions 248 may include access permissions defined by a user 124 for any information stored in the digital wallet 236 or stored remotely on a server. The permissions 248, for example, may simply define circumstances, timing, request requirements, authentication requirements associated with sharing certain personal digital data 240 and/or digital relationship information 244. In some embodiments, the permissions 248 may be generic to all information stored in the digital wallet 236 or may be specific to particular information/data stored in the digital wallet 236. For instance, a user 124 may define specific permissions required with accessing or maintaining personal digital data 240 whereas other digital relationship information 244 has not permissions 248 associated therewith.

The sharing rules 252 may contain information that controls/restricts or otherwise defines conditions under which digital data 240 and/or digital relationship information 244 is shared with another user or made available to a reading device 108, for example. In some embodiments, sharing rules 252 may be defined by a user 124 of the device and/or by other users that have a digital relationship with the user 124 of the device. For instance, if device 104 is carried/owned by a first user 124*a*, but the first user 124*a* has a digital relationship with a second user 124*b*, the permissions 248 on the first user's 124*a* device 104*a* may be controlled/administered by the first user 124*a* whereas sharing rules 252 may, in some manner, be defined or controlled by the second user 124*b* because of the second user's 124*b* shared digital relationship with the first user 124*a*. Additional details and use-case examples for the digital data 240, digital relationship information 244, and other information stored in a digital wallet 236 will be described in further detail herein.

Examples of applications 228 and their instructions sets 232 that may be maintained in memory 208 include calling applications, web browsing applications, social networking applications, gaming applications, camera applications, photo applications, video applications, messaging applications, word-processing applications, calendaring applications, contact management applications, and any other known type of application. In some embodiments, the applications 228 may also have personal digital data 240 associated therewith or digital relationship information 244 associated therewith. For instance, a social networking application 228 on the device 104 may have some access to personal digital data 240 and/or digital relationship information 244 for the user 124 within the social network platform. In some instances, such application-specific, but sensitive information may be stored in the digital wallet 236 rather than simply be stored as part of generic application data 232. Access to data within the digital wallet 236 by an application may be facilitated by one or more APIs within the O/S 224, which generally controls the operation of the digital wallet 236. The APIs of an O/S 224 may further enable the applications 228 to have access to other hardware components of the device 104, 108 (e.g., communication interface, user interface, etc.).

The communications interface 212 provides hardware and drivers that enable the device 104, 108 to connect with the network 112, receive communications from the network 112, and/or provide communications to the network 112 for delivery to another user device. The communications interface 212 may also include functionality that facilitates device-to-device connectivity (e.g., Bluetooth, Bluetooth Low Energy (BLE), NFC, etc.) connections. It should be appreciated that the communications interface 212 may include one or multiple different interfaces that facilitate different kinds of wireless and/or wired connectivity. In some embodiments, the communications interface 212 includes a wired and/or wireless network adapter. Non-limiting examples of a communications interface 212 include an antenna and associated driver (e.g., a WiFi or 802.11N antenna and/or driver), an Ethernet card and/or driver, a serial data port (e.g., a USB port) and/or driver, a Bluetooth or BLE antenna and/or driver, an NFC antenna and/or driver, or any other type of device that facilitates inter-device communications. The communications interface 212 may receive one or more data packets or messages from the communication network 112 and extract data therefrom. The data extracted from the received data packets or messages may be provided to the processor 204 where the data can subsequently be processed using instructions stored in memory 208. Similarly, a Bluetooth or BLE interface may enable the exchange of information with another device 104, 108, but such exchanges may not necessarily require the exchange of data packets.

The power supply 216 may correspond to an internal power source and/or adapter for connection with an external power source. In the example of an internal power source, the power supply 216 may correspond to a battery or cell of batteries used to power the various other components of the user device 104, 108. Alternatively or additionally, the power supply 216 may include a power converter or power conditioner that enables power received from an external source (e.g., a 120V AC power source) to be converted into useable DC power that can be supplied to the various components of the user device 104, 108.

The user interface 220 may correspond to a user input device, a user output device, a combination user input/output device, or a number of such devices. As an example of a user input device, the user interface 220 may include a microphone, a button, a physical switch, a camera, an accelerometer, or the like. As an example of a user output device, the user interface 220 may include a speaker, a light, a display screen, a tactile output device (e.g., a haptic feedback device), or the like. As an example of a combination user input/output device, the user interface 220 may include a touch-sensitive display screen that has one or more areas thereof capable of presenting a Graphical User Interface (GUI) element and, if touched or selected by a user, recognizing that the GUI element has been selected by the user.

Figure 3:
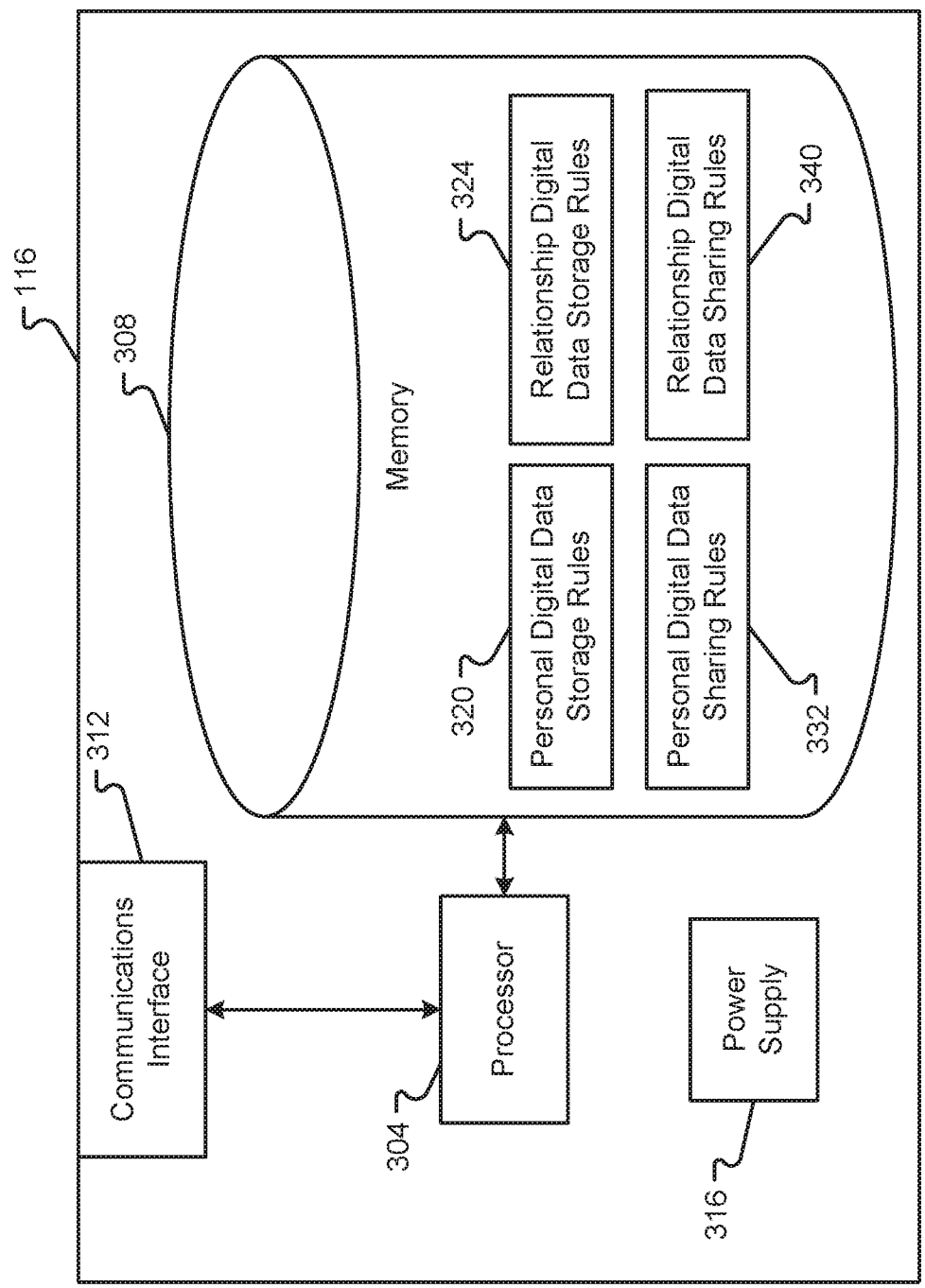
FIG. 3 is a block diagram illustrating components of a server implementing a digital relationship management service according to one embodiment.

With reference now to FIG. 3, details of a digital relationship management service 116, or more specifically a server providing the digital relationship management service 116, will be described in accordance with at least some embodiments of the present disclosure. The digital relationship management service 116 may be executed by a single server, a plurality or servers, one or more virtual machines operating on a server, a server cluster, or the like. A server may, in some embodiments, have several components similar to a device 104, 108 except that the server generally does not provide a rich user interface. Rather, the server executing the digital relationship management service 116 is shown to include a processor 304, memory 308, a communications interface 312, and a power supply 316. Although certain elements are shown as being provided in memory 308 and not memory 208, it should be appreciated that some or all of the components depicted in FIG. 3 may be provided in a device 104, 108. Likewise, some or all of the components depicted in FIG. 2 may be provided in a digital relationship management service 116 without departing from the scope of the present disclosure.

In some embodiments, the processor 304 may be similar or identical to processor 204. As an example, the processor 304 may include one or more of a microprocessor, an IC chip, an ASIC, or combinations thereof. Likewise, the memory 308 may be similar or identical to memory 208. As an example, the memory 308 may include one or more computer memory devices that may be volatile or non-volatile in nature. The power supply 316 may be similar or identical to power supply 216. As an example, the power supply 316 may correspond to a power converter that is capable of converting AC input power into DC power that is useable by the various components of the server(s) providing the service 116.

Memory 308 is further shown to include instructions that enable the digital relationship management service 116 to provide users 124 with the ability to establish digital personas and then further establish digital relationships or links between different digital personas of other users 124. As discussed above, some or all of the instructions stored in memory 308 may be executable by the processor 304 in connection with providing the services described herein.

As some non-limiting examples, the memory 308 may include personal digital data storage rules 320, relationship digital data storage rules 324, personal digital data sharing rules 332, and relationship digital data sharing rules 340. These various instructions, preference, or rules may be provided within a single application stored in memory 308 or they may be separated as shown. In some embodiments, the personal digital data storage rules 320 may define how a particular user 124 wants their digital information stored/managed by the service 116. As a more specific example, the personal digital data storage rules 320 may include rules or preferences defined by a user 124 that control how the service 116 stores and manages that particular user's 124 digital information (e.g., username, password, contact information, financial information, PII, etc.). In comparison, the relationship digital data storage rules 324 may include preferences of one or multiple users related to how digital relationship information is stored by the service 116, who has access to such information, who has permission to change such relationships, what extent of the digital relationship information is maintained by other users belonging to the relationship, etc. As a very simple, non-limiting example, a first user 124*a* (e.g., a parent) may define a digital persona for themselves and further define how that digital information is stored/maintained by administration of the personal digital data storage rules 320. That same user 124*a* may then create one or more digital personas for their children (e.g., users 124*b,* 124*c,* etc.). If their children are not adults, then the first user 124*a* may further establish and control the storage rules for their children within the digital data storage rules 320. If the first user 124*a* further creates a digital relationship between their digital persona and the digital personas of their children, then the first user 124*a* may define how the digital relationship information is stored via the relationship digital data storage rules 324.

Continuing the above example, the first user 124a may define how their digital persona is shared with other entities that might want to rely on that information for authentication purposes of other purposes. The definition of how such information is shared can be provided by and maintained with the personal digital data sharing rules 332. Said another way, the personal digital data sharing rules 332 may control how a particular user's digital persona is shared with a reading device or other applications.

Lastly, the first user 124a may want to limit or control how other related users share and describe the relationship between the first user 124a and other users (e.g., the first user's 124a children). This can be achieved by defining sharing permissions within the relationship digital data sharing rules 340. In some embodiments, the relationship digital data sharing rules 340 may have permissions for sharing relationship information and those permissions may be controlled by a single user belonging to the relationship (e.g., the first user 124a acting as a parent in the above example) or those permissions may be controlled by each of the users belonging to the relationship. In some embodiments, if multiple users are allowed to define or control the relationship digital data sharing rules 340, then there may be situations where one user defines a more restrictive sharing rule whereas another user belonging to the same relationship defines a less restrictive sharing rule. Since both sharing rules are associated with a common relationship, embodiments of the present disclosure contemplate using the most restrictive sharing rule among the various sharing rules 340 defined for a common relationship. In this way, all defined sharing rules can be accommodated or satisfied. If, however, two sharing rules directly conflict one another (e.g., satisfaction of one user's sharing rule will violate another user's sharing rule), then an arbitration rule may be utilized. Such arbitration rules may be defined ahead of time (e.g., at the time of creating a digital relationship between two or more users).

Figure 4:
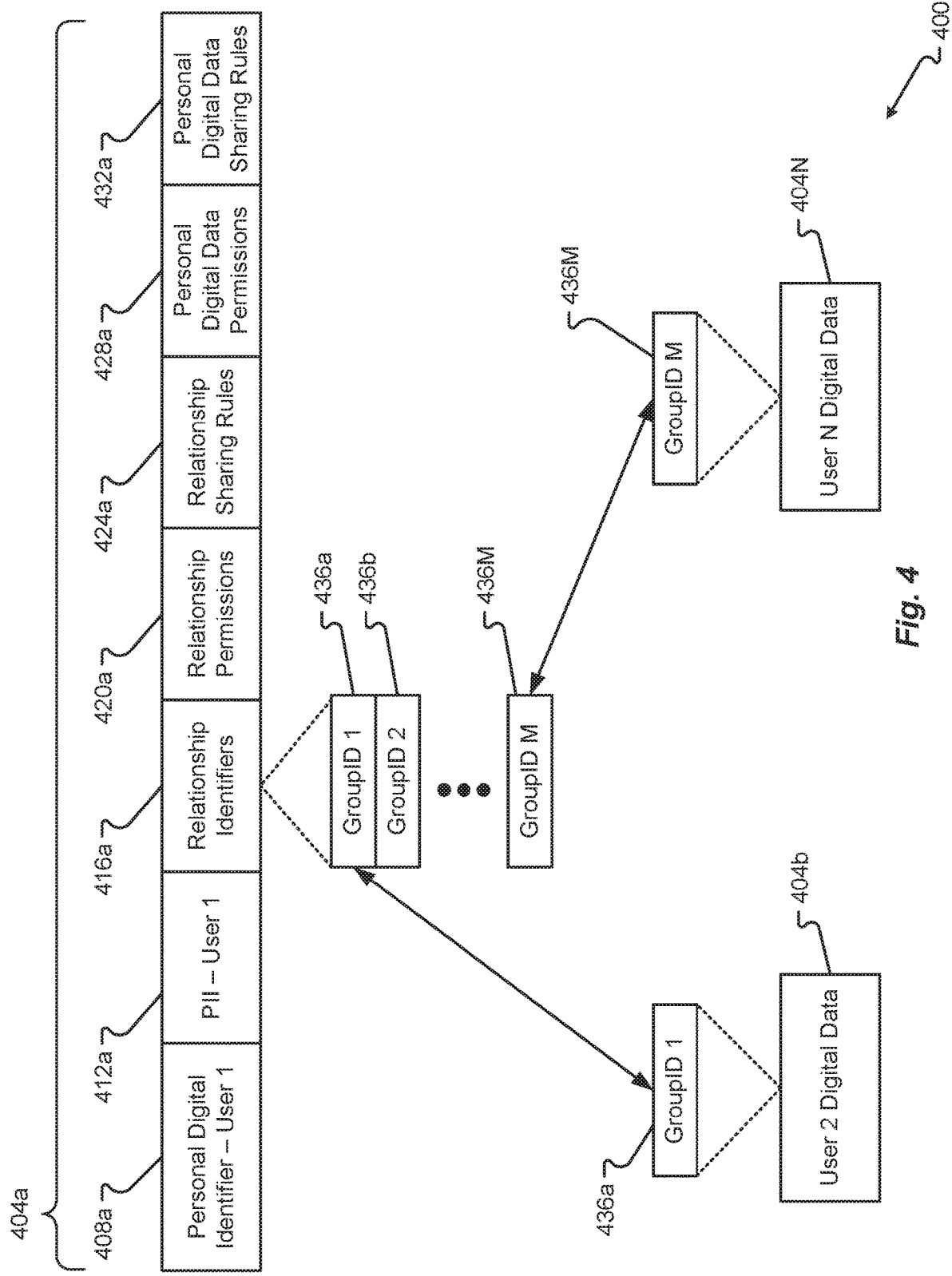
FIG. 4 is a block diagram depicting a data structure used in connection with providing a digital relationship management service according to one embodiment.

With reference now to FIG. 4, additional details of a data structure 400 used to maintain digital relationship information will be described in accordance with at least some embodiments of the present disclosure. The data structure 400 may be stored in a single data storage location (e.g., a centralized database like a centralized digital relationship database 120) or among a plurality of storage media (e.g., as a distributed ledger, among a Distributed Storage Network (DSN), etc.). Digital data for a particular user 404a-N may include a plurality of different data fields and digital data for a first user 404a may be related to digital data for a second user 404b. The connections and relationships between the user's digital data 404a-N may be maintained with one or more relationship identifier fields 416a, which may include a plurality of different group identifiers 436a-M. The group identifiers 436a-M may include pointers between related digital records or data for different users. Thus, a user's personal digital data 404a-N may not necessarily be exposed to a relying party 128 if all that is needed for the relying party 128 is a proof of relationship between users. Such a proof of relationship may be satisfied vis-à-vis the relationship identifier field 416a, or more specifically a group identifier 436a-M referenced within the relationship identifier field 416a. Some group identifiers 436a-M may simply prove a relationship between two digital personas of two different users whereas other group identifiers 436a-M may prove relationships between more than two digital personas by having reference to three or more different digital data structures 404a-N.

Examples of the data fields that may be provided in data structure 400 include, without limitation, a personal digital identifier field 408a, a PII field 412, a relationship identifier field 416a, a relationship permissions field 420a, a relationship sharing rules field 424a, a personal digital data permissions field 428a, and a personal digital data sharing rules field 432a. The fields of one users digital data (also referred to as a digital persona) may have the same or similar fields as other data structures used to store digital data or a digital persona for other users; however, it should be appreciated that some data structures for some users may have a greater or lesser number of fields without departing from the scope of the present disclosure.

The personal digital identifier field 408a for a particular user (e.g., the first user 124a) may include information used to identify the first user 124. Such information contained in the personal digital identifier field 408a can include a username, an email address, a uniquely-assigned number, a password, or some other data that uniquely or substantially uniquely (e.g., within a particular domain) identifies one user different from other users within a particular computing interaction platform. It should be appreciated that a single user 124 may have multiple digital personas within different interaction platforms (e.g., social networking sites, service sites, etc.). As such, a single user may have multiple digital data structures 404 at their disposal. As a non-limiting example, the first user 124a may have a digital persona on a first social networking site (e.g., Facebook, Instagram, etc.) and a corresponding data structure 404a for that digital persona. The same first user 124a may have another, different, different digital persona with a different web-service provider (e.g., Amazon, Apple, Google, etc.), in which case the first user 124a may have another different data structure 404a for that digital persona. Of course, a single data structure 404a may be configured to store all of the different digital personas for a single user without departing from the scope of the present disclosure.

The PII field 412a may correspond to an optional field within the data structure 404a. The PII field 412a can be used to store PII for the user, which may correspond to any type of data that can be used to specifically identify the user. As compared to information stored in the digital identifier field 408a, which is effectively a pseudonym for the user within a particular platform, the data contained in the PII field 412a can actually be used to identify a user. Non-limiting examples of PII include an individual's identity, such as name, social security number, date and place of birth, mother's maiden name, or biometric records. Data contained within the PII field 412a may or may not be encrypted and may require other secure forms of maintenance and control/access permissions associated therewith.

The relationship permissions field 420a may include any permissions defined by the user (e.g., the first user 124a) that are associated with controlling, maintaining, deleting, adjusting, or otherwise exposing the group identifiers 436a-M within the relationship identifiers field 416a. For instance, each group identifiers 436a-M maintained within the relationship identifiers field 416a may have a particular set of permissions associated therewith and those permission, including rules for accessing or changing the group identifiers or participants of a particular group, may be stored within the relationship permissions field 420a. In some embodiments, the relationship permissions field 420a may contain the same or similar information as the relationship digital data storage rules 324.

The relationship sharing rules field 424a may contain user-specific rules for sharing or exposing a particular group identifier 436a-M or for sharing any group identifier within the relationship identifiers field 416a. The relationship sharing rules field 424a may include rules for controlling when a group identifier 436a-M can be shared with a relying party 128. For instance, the relationship sharing rules 424a may include authentication requirements and/or circumstances under which a group identifier 436a-M may, or may not, be shared with a relying party 128. As an example, some group identifiers 436a-M may have sharing rules associated therewith that allow free and unencumbered sharing with any relying party 128 whereas other group identifiers 436a-M may have more restrictive sharing rules associated therewith (e.g., a definition of circumstances or criteria required for sharing). This information for each group identifier 436a-M may be stored in the relationship sharing rules field 424a. In some embodiments, the relationship sharing rules field 424a may contain the same or similar information as the relationship digital data sharing rules 340.

The personal digital data permissions field 428a may store data that controls the personal digital data stored in the digital identifier field 408a. For instance, the personal digital data permissions field 428a may include permissions associated with storing a digital identifier, permissions associated with storing PII, permissions associated with changing the digital identifier, and so on. The permissions field 428a may contain the same or similar data as is stored within the personal digital data storage rules 320.

The personal digital data sharing rules field 432a may store data that controls sharing rules for the information from the fields 408a, 412a. In some embodiments, the personal digital data sharing rules 432a may be defined by the user to control when, and to what extent, their personal digital data or PII is released from its secure storage area. The personal digital data sharing rules field 432a may store the same or similar data as is stored win the personal digital data sharing rules 332.

FIG. 4 also shows how different data structures 404a-M can be interrelated or have defined relationships via use of the relationship identifiers field 416a within each respective data structure. Although not depicted in detail, the other data structures 404b-M may also have relationship identifier fields 416b-M that reference the same group identifier 436 referenced by the first data structure 404a. By having multiple data structures reference a common group identifier 436 it becomes possible to prove a relationship exists between two different digital personas without having to expose the entirety of the digital personas. For example, a digital relationship between a first user 124a and second user 124b may be shown/proven by each data structure 404a, 404b referencing the common first group identifier 436a. This first group identifier 436a can be shared with a relying party to prove the existence of a relationship, but does not require data from fields 408a, 408b, 412a, or 412b to be shared with the relying party 128. In some embodiments, if the relying party 128 has access to transaction/financial information for the first user 124a, the first user 124a may enable the second user 124b to authorize a transaction using the first user's 124a transaction/financial information if the relying party 128 is provided with a sufficient proof of relationship between the users. This proof may be satisfied through sharing of the first group identifier 436a. The extent to which the second user 124b is allowed to share the first group identifier 436a may be controlled by relationship sharing rules 424a, 424b defined by both users. The type of data for the first user 124a that is made available from the fields 408a, 412a when the first group identifier 436a is shared may be controlled by the personal digital data permissions 428a of only the first user 124a. The parties allowed to join or reference the first group identifier 436a may be controlled by the relationship permissions field 420a of the first user 124a, and not the relationship permissions field 420a of the second user 124b if it is the first user 124a that established/created the first group identifier 436a.

Figure 5:
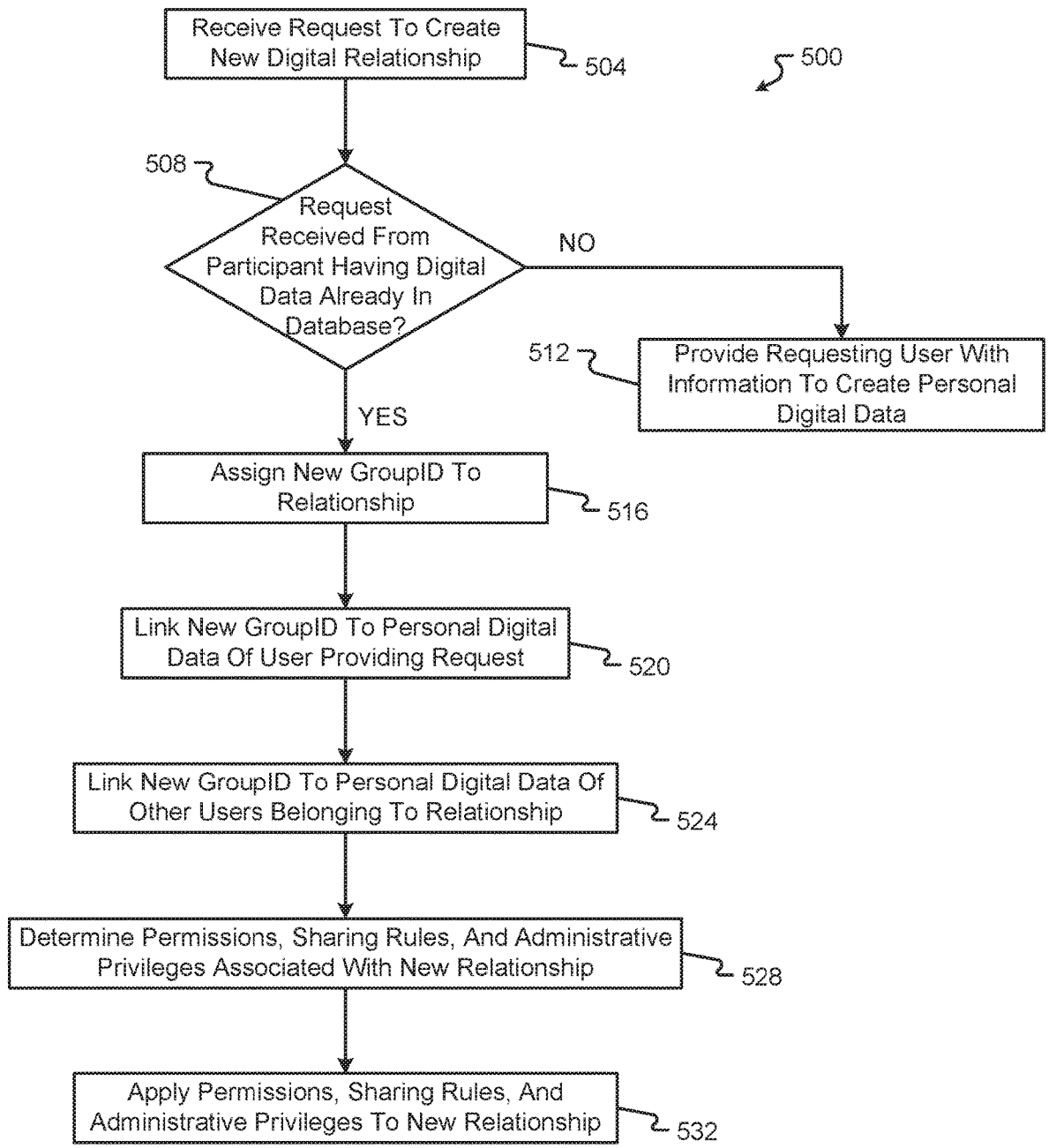
FIG. 5 is a flow diagram depicting a method of creating relationship digital data according to one embodiment.

With reference now to FIG. 5, an illustrative method 500 of creating a digital relationship will be described in accordance with embodiments of the present disclosure. The method 500 may be used to establish a relationship identifier field 416 within a user's digital persona/data structure 404 or to establish/create a new group identifier 436 within the relationship identifier field 416. The method 500 begins when the digital relationship management service 116 receives a request to create a new digital relationship (step 504). The method 500 continues with the service 116 determining whether the request has been received from a participant having digital data within the digital relationship database 120 (or similar data storage structure) (step 508). If this query is answered negatively, the requesting user will be provided with information instructing them to create personal digital data or a digital persona (step 512). The information provided to the user may include step-by-step instructions for creating the personal digital data. When the user finally creates their personal digital data, the user may re-engage the method 500 at step 504.

If the query of step 508 is answered affirmatively, the method 500 is allowed to continue with the assignment of a new group identifier 436 to the relationship being created (step 516). The group identifier 436 may simply comprise a pseudo randomly-generated number, a systematically-generated number, a series of characters, a series of symbols, hash values generated with some data from the data structure 404 of each participant to the relationship (e.g., a username of each participant to the relationship), combinations thereof, etc. The newly-assigned group identifier 436 may then be linked to the data structure 404 of the user that requested creation of the group identifier 436 (step 520). This link may be created by including a pointer within the group identifier 436 or including information in the group identifier 436 that references the relationship identifiers field 416 of the requesting user's data structure 404. The link may correspond to an actual link (e.g., a hyperlink referencing the data structure) or a virtual link (e.g., a reference number).

The method 500 continues with the new group identifier being linked to data structures 404 of other users that are intended to belong to the relationship (step 524). The link to other data structures 404 may be provided in the same format as the link to the requesting user's data structure 404. In this way, each user belonging to the relationship has their respective data structure 404 pointing to or linked with the common group identifier 436.

The method 500 then continues by determining permissions, sharing rules, and administrative privileges associated with the new relationship (step 528). As discussed above, the scenarios and variations of scenarios for this step may vary greatly. For instance, the creating user may be allowed to initially define all of the permissions, sharing rules, and administrative privileges for the relationship (and the group identifier), but eventually other users belonging to the relationship may be allowed to change or define one or more permissions, sharing rules, and administrative privileges. In some embodiments, an initial template (e.g., a default template) may be used to automatically define the permissions, sharing rule, and administrative privileges for the relationship and changes from the initial template may require proactive input from the user(s) belonging to the relationship.

Once the permissions, sharing rules, and administrative privileges are created for the relationship, the method 500 continues with the application of those permissions, sharing rules, and administrative privileges to the new relationship (step 532). This step may include updating appropriate data fields in each participating user's data structure 404 for the newly-generated group identifier or by just updating the fields within the requesting user's data structure 404.

Figure 6:
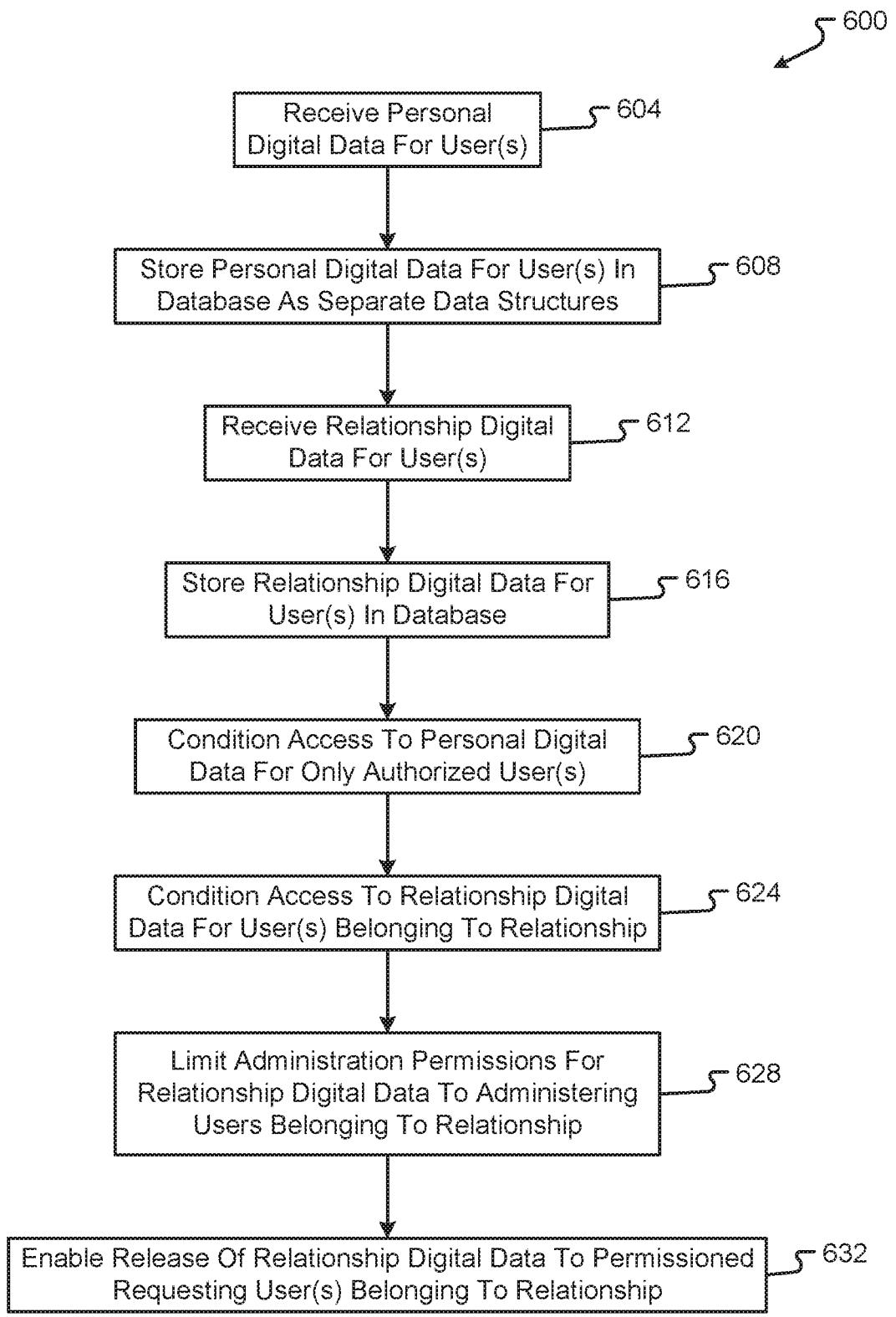
FIG. 6 is a flow diagram depicting a method of managing relationship digital data according to one embodiment.

With reference now to FIG. 6, a method 600 of controlling access to relationship information (e.g., a group identifier) will be described in accordance with at least some embodiments of the present disclosure. The method 600 begins with the receipt of personal digital data for one or more users (step 604). The method 600 continues by storing the personal digital data for each user as separate data structures 404a-N (step 608). The data structures 404a-N may be stored in a database 120 or across a distributed data storage network.

The method 600 continues when the digital relationship management service 116 receives relationship digital data for the users (step 612). In some embodiments, this data may be received during execution of method 500. Alternatively or additionally, the relationship digital data may be received as user's create and update their digital personas to include additional relationship information. The received relationship digital data can then be stored within the database 120 or whatever type of data storage system is being used to store the separate data structures 404 (step 616).

The digital relationship management service 116 may then condition access to the personal digital data to only authorized users (step 620). These permissions may be controlled with reference to personal digital data storage rules 320, personal digital data sharing rules 332, personal digital data permissions 428, and personal digital data sharing rules 432. Furthermore, the digital relationship management service 116 may condition access to the relationship digital data to only those users belonging to the relationship (e.g., able to reproduce or prove permissions to access personal digital data that references a particular relationship digital data, such as a particular group identifier) (step 624).

The digital relationship management service 116 may further limit administration permissions for the relationship digital data to users belonging to the relationship (step 628). Thus, if a user does not belong to or otherwise have reference to a particular relationship digital data, then that user may not be allowed to administer permissions for that particular relationship digital data. The digital relationship management service 116 may, however, enable the release or sharing of relationship digital data to permissioned requesting users (step 632). These permissions requesting users may belong to the relationship or otherwise have a digital persona that is linked with the group identifier associated with the relationship digital data.

Figure 7:
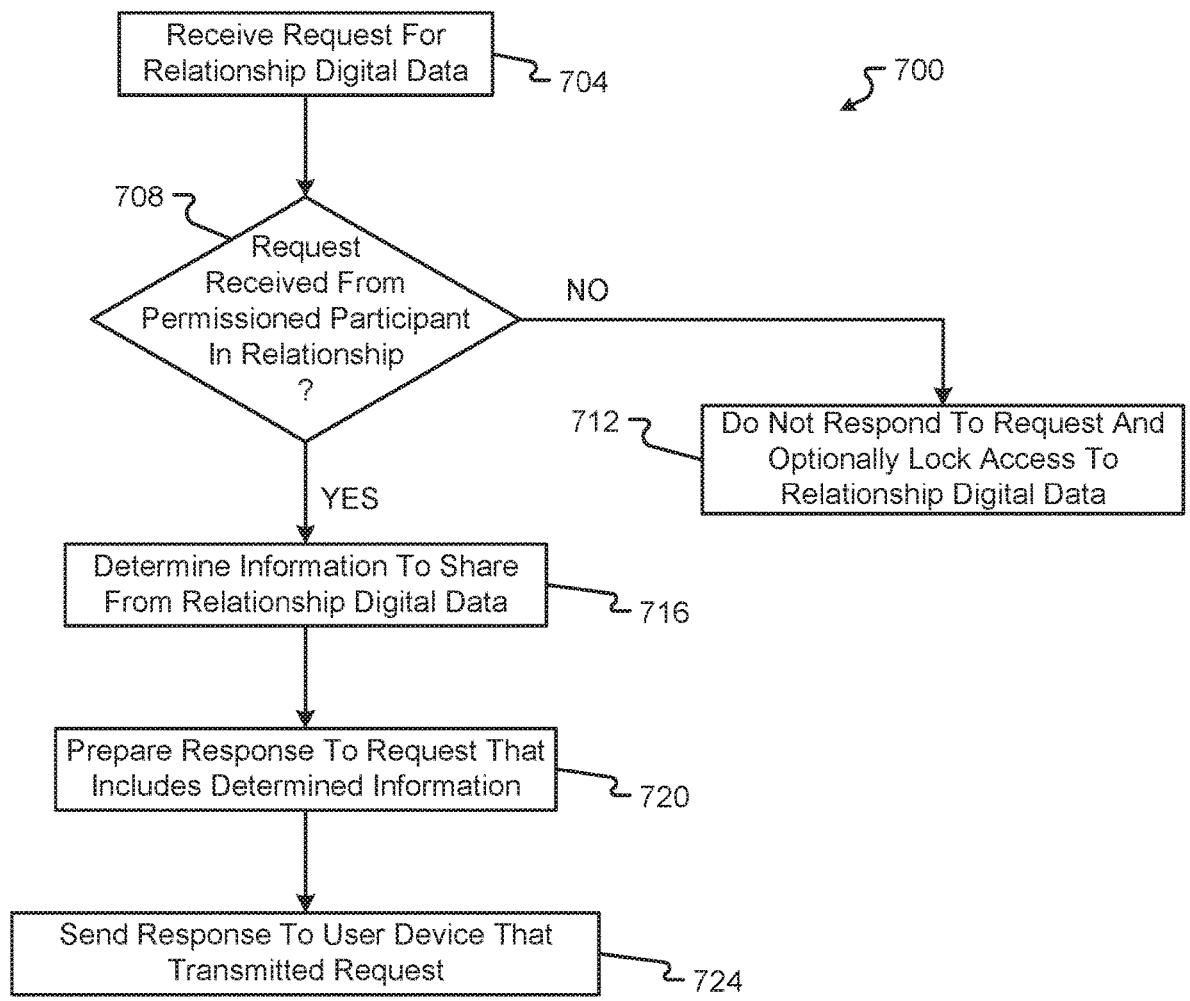
FIG. 7 is a flow diagram depicting a method of responding to a request for relationship digital data according to one embodiment.

With reference now to FIG. 7, a method 700 of responding to a request for relationship digital data will be described in accordance with at least some embodiments of the present disclosure. The method 700 begins with a digital relationship management service 116 receiving a request for relationship digital data (step 704). The digital relationship management service 116 processes the request by determining if the request is received from a permissioned participant belonging to the relationship (step 708). Proof of belonging to a relationship may be provided by way of a user device 124 sharing a hash value or some other data that shows the user device or the user of the device has knowledge of the relationship and, furthermore, belongs to the relationship. In some embodiments, if the user device is able to provide information about the associated group identifier for a relationship, then the user device that is determined to be a permissioned participant of the relationship. Alternatively or additionally, relationship sharing rules may be referenced and the user may have to pass some authentication/challenge and response protocol to prove they are permissioned participants of the relationship.

If the query of step 708 is answered negatively, then the digital relationship management service 116 may not respond to the request and, optionally, lock access to the relationship digital data being requested (step 712). If, on the other hand, the query of step 708 is answered affirmatively, the digital relationship management service 116 may continue by determining what type of relationship information is allowed to be shared from the relationship digital data (step 716). This process may be performed with reference to relationship sharing rules of some or all participants belonging to the relationship (e.g., any participant(s) having their data set 404 reference the group identifier 436 associated with the relationship digital data being requested).

The digital relationship management service 116 may then prepare a response to the request that includes the determined information (step 720). The response is then sent to the use device that transmitted the request (step 724). The response may be sent within a single message across the communication network 112 or directly to a user device 104 if the user device 104 is in direct communication with the digital relationship management service 116.

Figure 8:
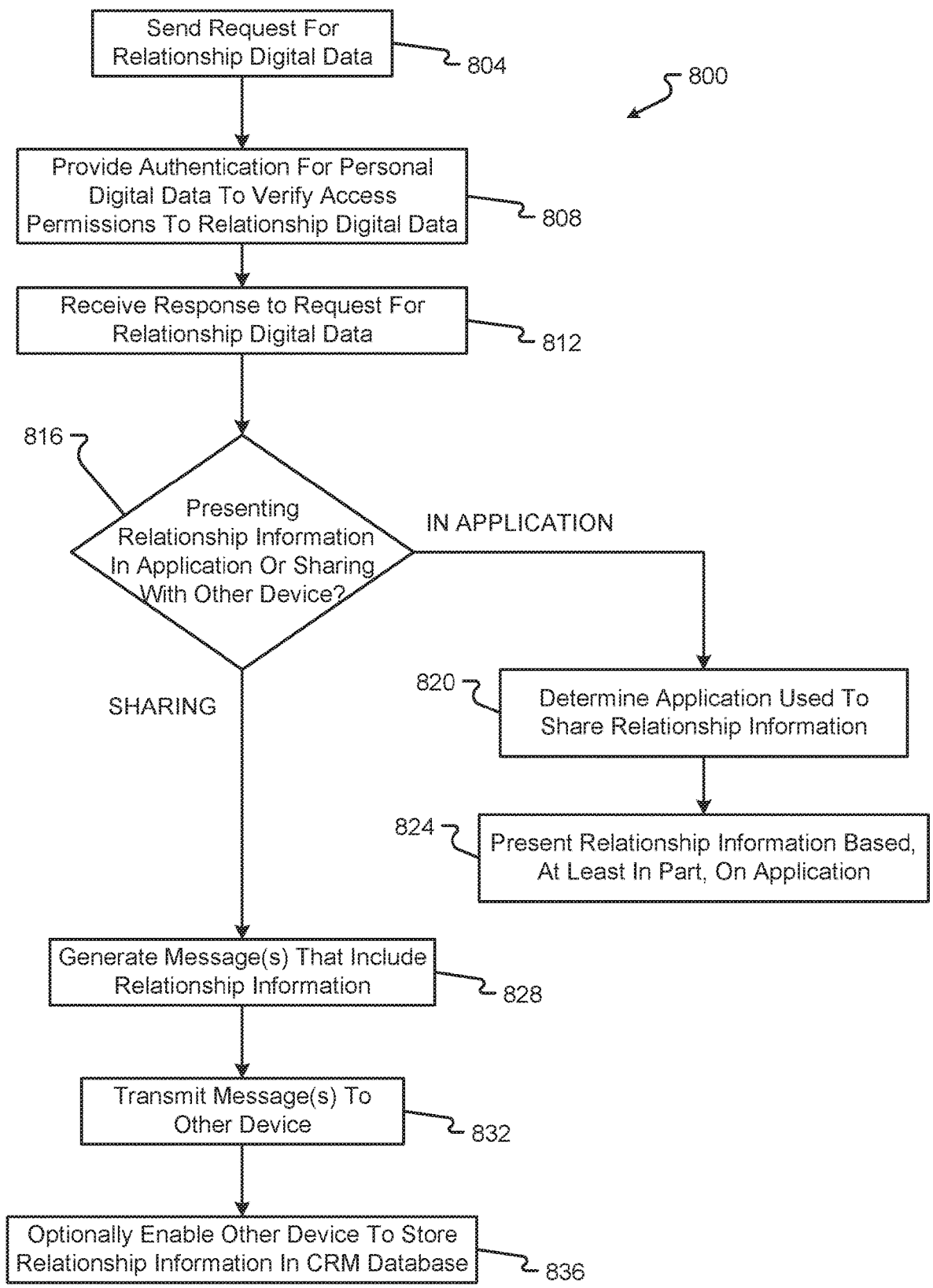
FIG. 8 is a flow diagram depicting a method of conveying relationship digital data according to one embodiment.

FIG. 8 depicts a method 800 of responding to a request for relationship digital data in accordance with at least some embodiments of the present disclosure. The method 800 begins when a user device 104 sends a request for relationship digital data (step 804). The user device 104 may be required to provide authentication information to the digital relationship management service 116 to verify that it is allowed to access the relationship digital data (step 808). Eventually, after the user device 104 has successfully authenticated itself with the digital relationship management service 116 or otherwise satisfied the necessary steps to obtain the relationship digital data (e.g., executed method 700), the user device 104 will receive the response to their request that contains the relationship digital data (step 812).

The method 800 will continue with the user device 104 determining whether and to what extent the relationship digital data will be shared with a reading device 108, to enable a relying party 128 to view or have access to the relationship digital data (step 816). In some embodiments, the user device 104 may retrieve particular relationship digital data when the user 124 thereof is trying to provide to the relying party 128 that they belong to a particular relationship and want to conduct a transaction (e.g., obtain a good or service by using a financial account of a different user belonging to the relationship). The user device 104, in such an example, may want to share proof of belonging to the relationship within an application of the user device 104 for a visual presentation to the relying party 128 or by actually sharing some of the relationship digital data directly to the reading device 108, which is operated by the relying party 128.

If the user device 104 is simply going to present the relationship digital data within a particular application and does not intend to share the relationship digital data, the method 800 continues with the user device 104 determining an appropriate application to use for presenting the relationship digital data (step 820). The appropriate application is then selected and used to present the relationship digital data via a user interface of the user device 104 (step 824). As a more specific, but non-limiting example, if the relationship digital data is proving a relationship exists between two social network profiles of two different users 124, then an application associated with the social networking platform may be used to present the relationship digital data or proof that the relationship exists between the user 124 that requested the relationship digital data and the other user belonging to the relationship. Alternatively, the relationship digital data may be presented within a dedicated application used for the storage and visualization of information stored in the digital wallet 236.

Referring back to step 816, if the user device 104 is going to share the relationship digital data with the reading device 108, the method 800 will proceed with the user device 104 generating one or more messages that include the relationship digital data or a portion thereof (step 828). The format of the message may depend upon the type of communication protocol used by the user device 104 and/or reading device 108. For instance, email, SMS, or the like may be used if the devices 104, 108 are communicating via the communication network 112. On the other hand, the message may be transmitted as an NFC message, one or more Bluetooth message packets, etc.

The message(s) containing the relationship digital data may be transmitted to the other device(s) (e.g., the reading device 108) (step 832). The reading device 108 may optionally be allowed to store (temporarily or persistently) some or all of the relationship digital data into a CRM database 132 (step 836).

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a database comprising entries of data for a plurality of different users, wherein the entries of data include an association between a user and personally identifiable information associated with the user as well as an expression of a relationship between a first user and a second user; and
a server, comprising:
a microprocessor;
a database interface that enables the microprocessor to access the entries of data maintained in a plurality of databases; and
memory that comprises instructions that are executable by the microprocessor, the instructions comprising:
instructions that enable the server to access the database with a query that contains an identification of the first user;
instructions that enable a response from the database to include an indication that the first user has a relationship with the second user without exposing the personally identifiable information for either the first user or the second user, wherein the response from the database includes a presentation of a relationship identifier that further identifies at least one other user in the database that has a relationship with the first user and the second user, wherein the first user defines a first sharing rule for sharing the relationship identifier, and wherein the second user defines a second sharing rule for sharing the relationship identifier; and
instructions that compare the first sharing rule with the second sharing rule, determine that the first sharing rule is different from the second sharing rule and, in response to determining that the first sharing rule is different from the second sharing rule, apply an arbitration rule to resolve the difference between the first sharing rule and the second sharing rule, wherein the response from the database is controlled based on application of the arbitration rule.

2. The system of claim 1, wherein the arbitration rule is created when the relationship identifier is created.

3. The system of claim 1, wherein the relationship identifier comprises a family identifier that corresponds to a substantially unique identifier assigned to a family that includes the first user and the second user.

4. The system of claim 3, wherein either the first user or the second user are provided with access to the database, thereby enabling an adjustment of permissions associated with the family identifier.

5. The system of claim 4, wherein the first user or the second user adjust the permissions associated with the family identifier to control a manner in which the family identifier is presented to another entity that is attempting to verify the relationship between the first user and the second user and wherein the instructions further comprise:

instructions that determine the first sharing rule is more restrictive than the second sharing rule and cause the arbitration rule to apply the first sharing rule instead of the second sharing rule in response to determining that the first sharing rule is more restrictive than the second sharing rule.

6. The system of claim 1, wherein the entries of data for the plurality of different users are stored in a plurality of databases in a distributed ledger format.

7. The system of claim 1, wherein the indication of the relationship between the first user and the second user is configured to be presented differently in a first application as compared to a second application.

8. A non-transitory computer readable medium comprising a set of instructions stored therein which, when executed by a processor, enable the processor to maintain relationship digital data, the instructions including:

instructions that enable access to entries of personal digital data for a plurality of users;

instructions that enable at least some of the personal digital data for the plurality of users to be retrieved via a query that contains an identification of a first user;

instructions that enable receipt of a group identifier in response to the query, wherein the group identifier is stored with reference to personal digital data of the first user and with reference to personal digital data of a second user;

instructions that enable distribution of relationship digital data that describes a relationship between the first user and the second user without exposing or requiring the personally identifiable information for either the first user or the second user, wherein the first user defines a first sharing rule for sharing the relationship digital data, and wherein the second user defines a second sharing rule for sharing the relationship digital data; and instructions that compare the first sharing rule with the second sharing rule, determine that the first sharing rule is different from the second sharing rule and, in response to determining that the first sharing rule is different from the second sharing rule, apply an arbitration rule to resolve the difference between the first sharing rule and the second sharing rule, wherein the distribution of the relationship digital data is controlled based on application of the arbitration rule.

9. The non-transitory computer readable medium of claim 8, wherein the distribution of the relationship digital data includes a presentation of the group identifier and wherein the arbitration rule is created when the group identifier is created.

10. The non-transitory computer readable medium of claim 9, wherein the group identifier comprises a family identifier that corresponds to a substantially unique identifier assigned to a family that includes the first user and the second user.

11. The non-transitory computer readable medium of claim 10, wherein either the first user or the second user are provided with access to a database that contains the family identifier thereby enabling an adjustment of permissions associated with the group identifier.

12. The non-transitory computer readable medium of claim 11, wherein the first user or the second user adjust the permissions associated with the family identifier to control a manner in which the family identifier is presented to another entity that is attempting to verify the relationship between the first user and the second user and wherein the instructions further comprise:

instructions that determine the first sharing rule is more restrictive than the second sharing rule and cause the arbitration rule to apply the first sharing rule instead of the second sharing rule in response to determining that the first sharing rule is more restrictive than the second sharing rule.

13. The non-transitory computer readable medium of claim 8, wherein the entries of personal digital data for the plurality of users are stored in a distributed ledger format.

14. The non-transitory computer readable medium of claim 8, wherein the indication of the relationship between the first user and the second user is configured to be presented differently in a first application as compared to a second application.

15. A method, comprising:

enabling access to entries of personal digital data for a plurality of users;

enabling at least some of the personal digital data for the plurality of users to be retrieved by a query that contains an identification of a first user and authentication information associated with the first user;

receiving a group identifier that is stored with reference to personal digital data of the first user, wherein the group identifier is also stored with reference to personal digital data of a second user;

distributing relationship digital data that describes a relationship between the first user and the second user based on existence of the group identifier, wherein the relationship between the first user and the second user is distributed without exposing any information from the personal digital data of the first user or the personal digital data of the second user, wherein the first user defines a first sharing rule for sharing the relationship digital data, and wherein the second user defines a second sharing rule for sharing the relationship digital data;

comparing the first sharing rule with the second sharing rule;

determining, based on comparing the first sharing rule with the second sharing rule, that the first sharing rule is different from the second sharing rule; and in response to determining that the first sharing rule is different from the second sharing rule, applying an arbitration rule to resolve the difference between the first sharing rule and the second sharing rule, wherein the relationship digital data is distributed based on application of the arbitration rule.

16. The method of claim 15, wherein the distribution of the relationship digital data includes a presentation of the group identifier, wherein the arbitration rule is created when the group identifier is created, wherein the group identifier comprises a family identifier that corresponds to a substantially unique identifier assigned to a family that includes the first user and the second user, wherein either the first user or the second user are provided with access to a database that contains the family identifier thereby enabling an adjustment of permissions associated with the group identifier, and wherein the first user or the second user adjust the permissions associated with the family identifier to control a manner in which the family identifier is presented to another entity that is attempting to verify the relationship between the first user and the second user.

17. The method of claim 15, wherein the entries of personal digital data for the plurality of users are stored in a distributed ledger format.

18. The method of claim 15, further comprising:
   presenting the relationship digital data with a digital device carried by the first user or the second user.

19. The method of claim 18, wherein the digital device comprises a wearable device or a smartphone.

20. The method of claim 19, wherein presenting the relationship digital data comprises rendering the relationship digital data on a user interface of the digital device carried by the first user or the second user.

\* \* \* \* \*